United States Patent
Peters (10) Patent No.: US 9,352,410 B2
(45) Date of Patent: May 31, 2016

(54) SYSTEM FOR AND METHOD OF NARROW-GROOVE JOINING OF METALS

(71) Applicant: LINCOLN GLOBAL, INC., City of Industry, CA (US)

(72) Inventor: Steven R. Peters, Huntsburg, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 522 days.

(21) Appl. No.: 13/832,138

(22) Filed: Mar. 15, 2013

(65) Prior Publication Data

US 2014/0263239 A1    Sep. 18, 2014

(51) Int. Cl.
| | | |
|---|---|---|
| *B23K 9/095* | (2006.01) | |
| *B23K 9/02* | (2006.01) | |
| *B23K 9/09* | (2006.01) | |
| *B23K 9/173* | (2006.01) | |

(52) U.S. Cl.
CPC ............. *B23K 9/0213* (2013.01); *B23K 9/09* (2013.01); *B23K 9/095* (2013.01); *B23K 9/173* (2013.01)

(58) Field of Classification Search
CPC .. B23K 9/1006; B23K 9/0213; B23K 9/0206; B23K 9/12
USPC .............. 219/130.21, 126, 130.51, 130.31, 219/130.1, 130.5, 137 PS
See application file for complete search history.

(56) References Cited

U.S. PATENT DOCUMENTS

| | | |
|---|---|---|
| 1,956,406 A | 4/1934 | Vars |
| 4,270,037 A | 5/1981 | Grinin et al. |
| 5,278,390 A | 1/1994 | Blankenship |
| 6,274,845 B1 | 8/2001 | Stava et al. |
| 6,498,321 B1 | 12/2002 | Fulmer et al. |
| 6,501,049 B2 | 12/2002 | Stava |
| 6,717,107 B1 | 4/2004 | Hsu |
| 6,717,108 B2 | 4/2004 | Hsu |
| 6,734,394 B2 | 5/2004 | Hsu |
| 6,847,008 B2 | 1/2005 | Myers et al. |
| 7,067,767 B2 | 6/2006 | Hsu |
| 2005/0224481 A1 * | 10/2005 | Nadzam et al. .......... 219/130.51 |
| 2005/0242075 A1 | 11/2005 | Kuiper et al. |
| 2008/0053978 A1 | 3/2008 | Peters et al. |
| 2013/0256288 A1 | 10/2013 | Matthews et al. |
| 2014/0001166 A1 | 1/2014 | Peters et al. |

FOREIGN PATENT DOCUMENTS

JP        59141377        8/1984

\* cited by examiner

*Primary Examiner* — Brian Jennison
(74) *Attorney, Agent, or Firm* — Perkins Coie LLP (57) ABSTRACT

A system and method is provided for narrow groove joining of metals. The method includes feeding a wire to a weld joint formed by the metals to be joined and transmitting a welding current through a length of the wire. The method also includes creating a molten puddle in the weld joint with the welding current. The method further includes performing a low heat transfer process on the wire for a predetermined low heat duration to transfer a first portion of the wire to the molten puddle, and performing a high heat transfer process on the wire for a predetermined high heat duration to transfer a second portion of the wire to the molten puddle. The low heat transfer process creates the molten puddle at a root of the weld joint. The high heat transfer process creates an arc that climbs sidewalls of the weld joint and the molten puddle follows the arc up the sidewalls to a top of the weld joint.

21 Claims, 7 Drawing Sheets

LOW HEAT SHORT ARC PHASE

FIG. 3B

HIGH HEAT PULSE SPRAY PHASE

HIGH HEAT PULSE SPRAY PHASE

FIG. 3C

HIGH HEAT PULSE SPRAY PHASE

FIG. 3D

LOW HEAT SHORT ARC PHASE

SYSTEM FOR AND METHOD OF NARROW-GROOVE JOINING OF METALS

BACKGROUND OF THE INVENTION

1. Field of the Invention

Systems and Methods of the present invention relate to welding and joining of hard to weld metals, and more specifically to narrow-groove welding/joining of hard to weld metals.

2. Description of the Related Art

Figure 1A:
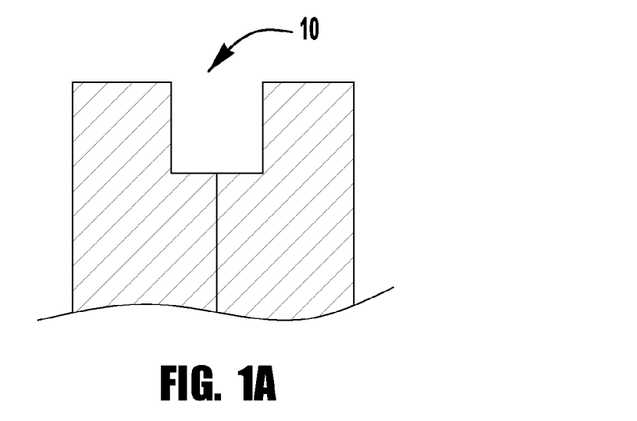
FIG. 1A illustrates a narrow-groove weld joint.
Figure 1B:
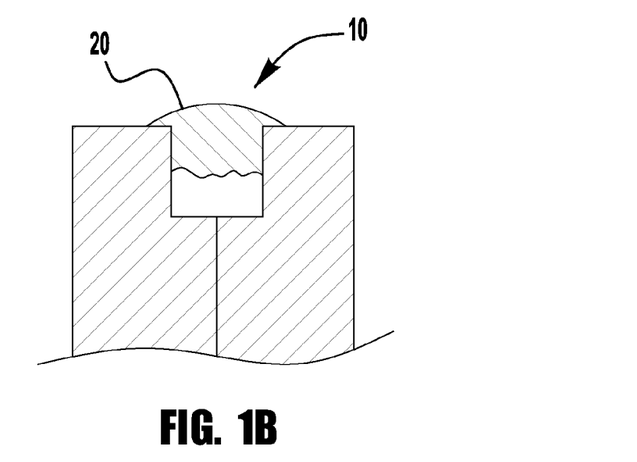
FIGS. 1B and 1C illustrate problems with conventional methods of welding the narrow-groove weld joint of FIG. 1A.
Figure 1C:
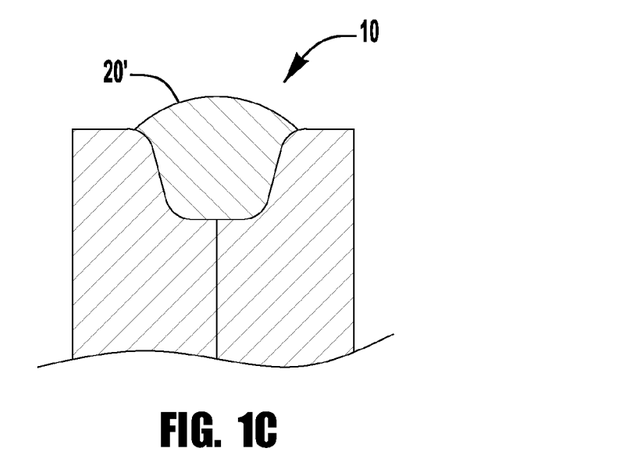

The joining/welding of weld joints of workpieces using a narrow groove technique can be difficult. For example, FIG. 1A illustrates a weld joint 10 that has a square groove with narrow spacing. Exemplary applications for such a joint is the welding/joining of hard to weld metals such as hard to weld steels, high carbon steels, etc. where minimum admixture is desirable but complete sidewall fusion is required. One example of a hard to weld joint is found in brake rotors, but of course, there are numerous other applications in which narrow-groove welding of hard to weld metals is desired. Conventional welding/joining methods can result in the weld 20 bridging the narrow gap resulting in a weak weld joint, as there is no penetration into the weld (see FIG. 1B). In addition, because the weld bead at the top of the weld is ground flush with the workpiece surface in many applications, complete fusion with the sidewalls is required for these narrow-groove applications. To minimize the bridging and achieve deeper penetration, higher heat input can be used to weld the joint, but this can result in excessive penetration of the joint edge and excessive admixture with the base material of the workpiece (see weld 20' of FIG. 1C). Excessive mixing of the weld metal and the base metal is especially problematic when the base material is composed of high-carbon steel, e.g., such as that found in brake rotors, making the resulting weld bead crack sensitive. Accordingly, sufficient but not excessive sidewall bonding is desirable to achieve sufficient joint strength.

Further limitations and disadvantages of conventional, traditional, and proposed approaches will become apparent to one of skill in the art, through comparison of such approaches with embodiments of the present invention as set forth in the remainder of the present application with reference to the drawings.

BRIEF SUMMARY OF THE INVENTION

Exemplary embodiments of the present invention include systems and methods for narrow groove joining of metals. These systems and methods allow the joining process to be "cold," i.e., minimal admixture, but still achieve sufficient strength without weakening the finished weld. The method includes feeding a wire to a weld joint formed by the metals to be joined and transmitting a welding current through a length of the wire. The method also includes creating a molten puddle in the weld joint with the welding current. The method further includes performing a low heat transfer process on the wire for a predetermined low heat duration to transfer a first portion of the wire to the molten puddle, and performing a high heat transfer process on the wire for a predetermined high heat duration to transfer a second portion of the wire to the molten puddle. The low heat transfer process creates the molten puddle at a root of the weld joint. The high heat transfer process creates an arc that climbs sidewalls of the weld joint and the molten puddle follows the arc up the sidewalls to a top of the weld joint.

The system includes a wire feeder that feeds a wire to a weld joint formed by the metals to be joined. The system also includes a power supply that transmits a welding current through a length of the wire, and the welding current creates a molten puddle in the weld joint. The system further includes a controller that performs a low heat transfer process on the wire for a predetermined low heat duration to transfer a first portion of said wire to said molten puddle, and performs a high heat transfer process on the wire for a predetermined high heat duration to transfer a second portion of the wire to the molten puddle. The low heat transfer process creates the molten puddle at a root of the weld joint. The high heat transfer process creates an arc that climbs sidewalls of the weld joint and the molten puddle follows the arc up the sidewalls to a top of the weld joint.

These and other features of the claimed invention, as well as details of illustrated embodiments thereof, will be more fully understood from the following description and drawings.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION OF EXEMPLARY EMBODIMENTS

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

Figure 2:
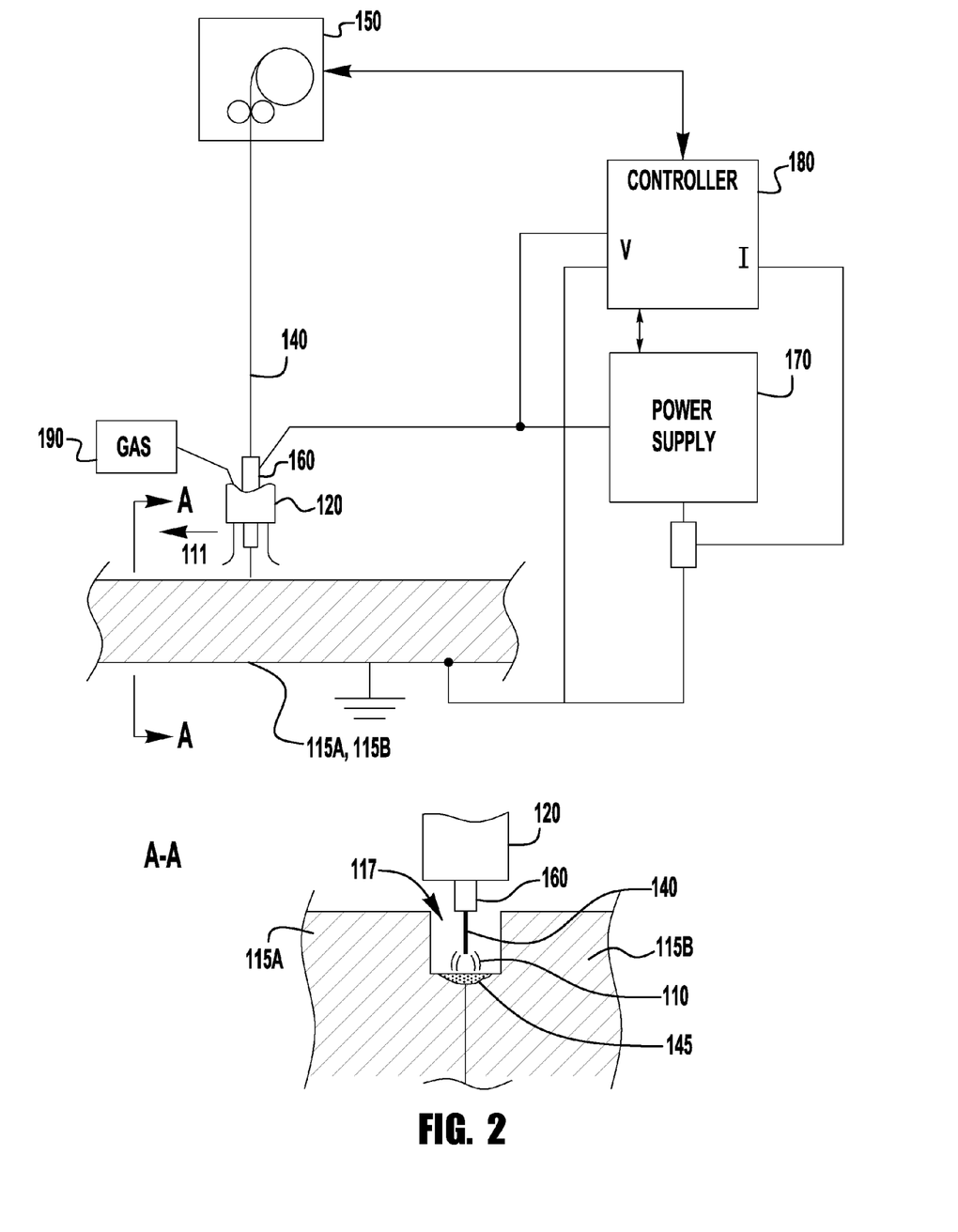
FIG. 2 is a diagrammatical representation of an exemplary embodiment of a welding system that is consistent with the present invention.

FIG. 2 depicts a welding system 100 in accordance with an exemplary embodiment of the present invention. The system 100 is a gas shielded metal arc welding (GMAW or MIG/MAG) system. However, other types of systems can be used with the present invention such as, e.g., metal core arc welding and flux cored arc welding. The system 100 includes a wire feeder 150 feeds a consumable electrode 140 (i.e., wire) to the weld joint 117 of workpieces 115A, 115B (see view A-A of FIG. 2). A power supply 170 outputs a welding current to the wire 140 via contact tube 160. The welding current creates an arc 110 that forms a molten puddle 145 (i.e., a weld puddle) in the weld joint 117. A gas supply system 190 provides shielding gas to torch 120 to isolate the arc 110 from the atmosphere. The system 100 also includes a controller 180 that controls the power supply 170 such that a desired welding waveform is output. In addition, the controller 180 can also be configured to control the wire feeder 150 for the desired wire feed speed and/or other operations, e.g., operations related to arc initiation. Arc welding systems such as the GMAW system illustrated are known in the art. Thus, for brevity, detailed operation of the system 100 will not be discussed, except as necessary to explain the present invention.

In the system of FIG. 2, the weld joint 117 is a narrow-groove weld joint similar to that illustrated in FIG. 1A. However, unlike conventional methods, the system in FIG. 2 is controlled such that workpieces 115A, 115B will be joined with good bonding at the sidewalls and with minimum admixture of the base material. This is accomplished by joining the workpieces 115A, 115B using a combination of a low heat welding process (such as, e.g., short arc, surface tension transfer (STT), shorted retract welding, etc.) and a high heat welding process (such as, e.g., pulse spray transfer and wire feed speed modulation). The low heat process allows the arc 110 to "tighten up" and drop to the root of the weld joint 117 so as to prevent bridging of the gap as seen in conventional methods. The wider arc plume of the high heat process expands the puddle 145 to encompass the sides of the joint 117 and the arc 110 rides up the puddle 145 as the arc 110 deposits weld metal into the joint 117. Thus, the high heat process ensures that there is sufficient admixture with the base metal to produce a good bond without weakening the weld due to excessive high-carbon steel admixing with the wire 140. For clarity, the present invention will be described with reference to an exemplary embodiment using a short arc transfer process as the low heat input process and a pulse spray transfer process as the high heat input process. However, as stated above, the present invention is not limited to just these processes and the short arc transfer process can be substituted with other low heat input processes such as STT and CMT and the pulse spray transfer process can be substituted with other high heat input processes such as increasing or modulating the wire feed speed.

Figure 3A:
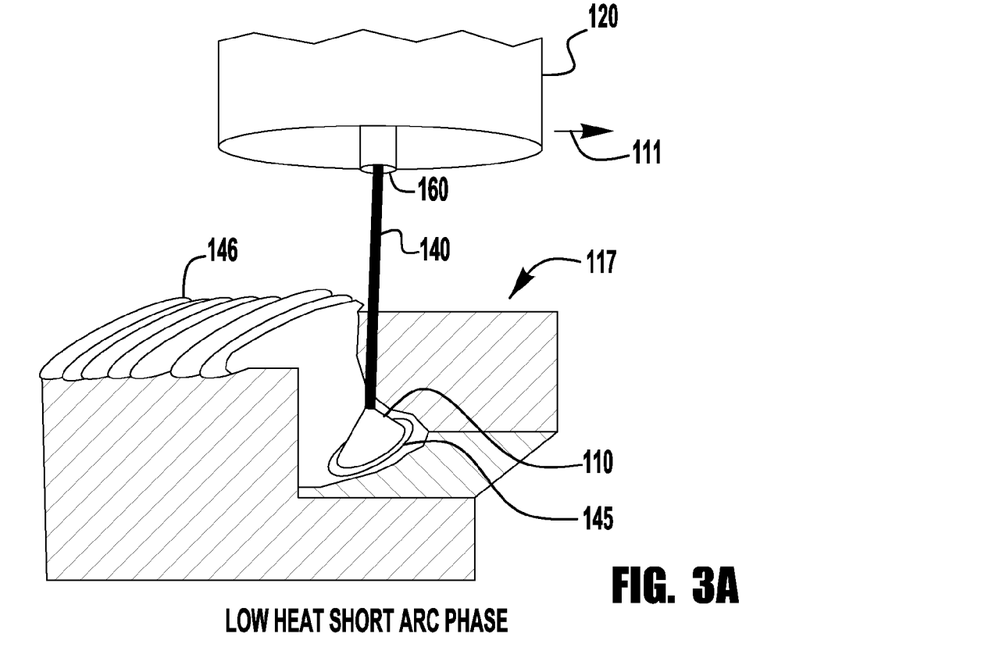
FIGS. 3A-3E illustrate the deposition of wire material in the weld joint of the system in FIG. 2.
Figure 3B:
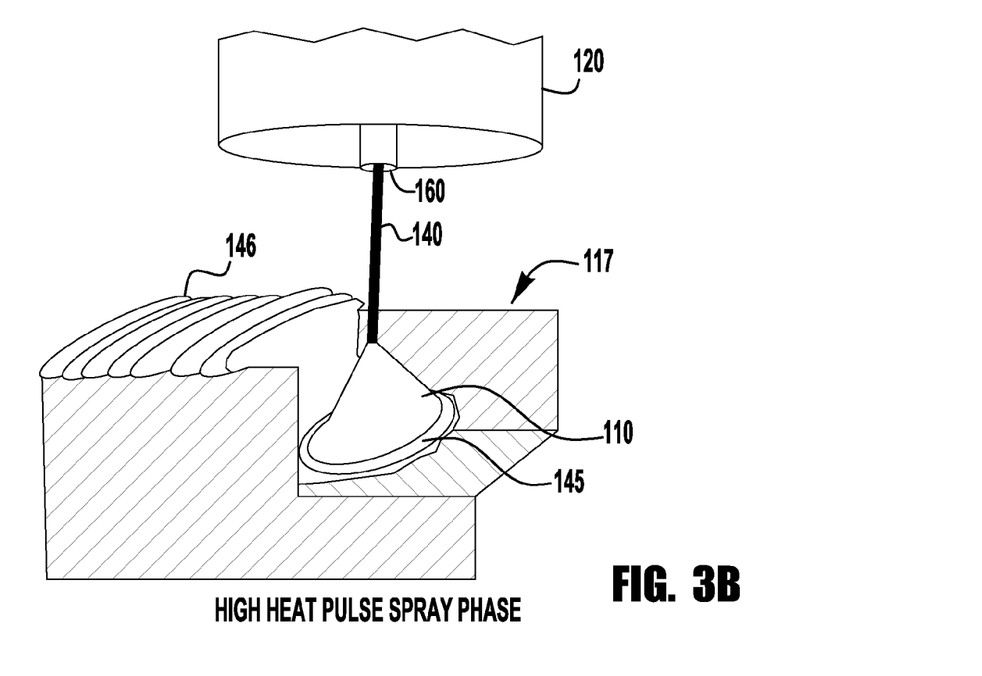
Figure 3C:
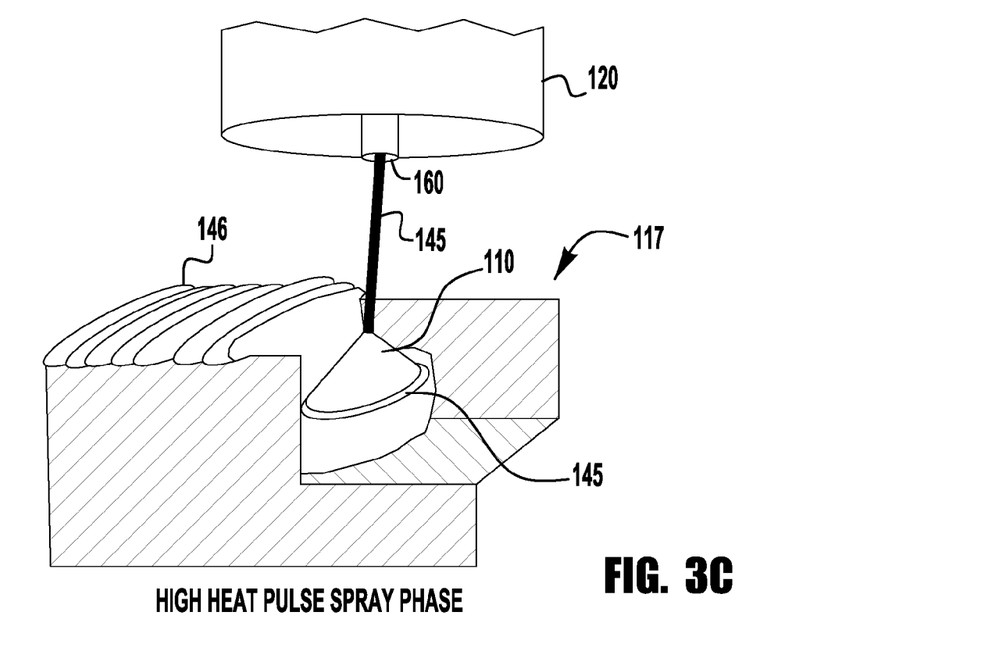

As illustrated in FIG. 3A, the torch 120 travels in direction 111 along weld joint 117. Power supply 170 (see FIG. 2) is controlled such that its output is switched from a short arc transfer process to a pulse spray transfer process by, e.g., controller 180 or some other device. During the short arc transfer process, the arc 110 is tight and wire 140 will be pushed to the bottom of the weld joint 117. At this time, the weld puddle 145 is small and there is little or no penetration into the base metal of workpieces 115A, 115B. After a predetermined time period, e.g., 50 ms to 1 second, the controller 180 will switch to the high heat input process and will control the power supply 170 such that the power supply 170 outputs a pulse spray transfer waveform. Of course, instead of being based on a predetermined time period, the switch from the short arc transfer process can be based on the number of short arc cycles, e.g., by counting the peak current periods. Once the power supply 170 outputs the pulse spray transfer waveform, the length and width of the arc 110 will quickly increase (see FIG. 3B). At this time, the weld puddle 145 is still at the bottom of the weld joint 117, but the arc 110 is quickly growing towards the sidewalls of the weld joint 117. As the arc width increases, the arc 110 will start to climb the sidewalls of the weld joint 117 and the puddle 145 will follow (see FIG. 3C). As the puddle 145 climbs the sidewalls, the heat of the puddle 145 will achieve the desired penetration into the sidewalls, i.e., some of each sidewall will melt and mix with the weld puddle 145. This penetration will ensure that there is sufficient bonding between the sidewalls and the finished weld 146. The low heat input phase of the present invention ensures that the arc 110 collapses sufficiently enough to allow the wire 140 to push it to the root of the of weld joint 117. At the start of each high heat phase, a minimal puddle 145 is located at the root of the joint 117 and the expanding arc plasma will ride up the joint 117 for the duration of the high heat input phase. Accordingly, even if the sidewalls contain high-carbon steel or other alloys, the admixture between the weld metal and the base metal is not sufficient to appreciably weaken the finished weld 146. Additionally, the heat input is minimal to reduce distortion. Further, the groove can be very narrow, as the weld process does not bridge the root of the joint 117.

Figure 3D:
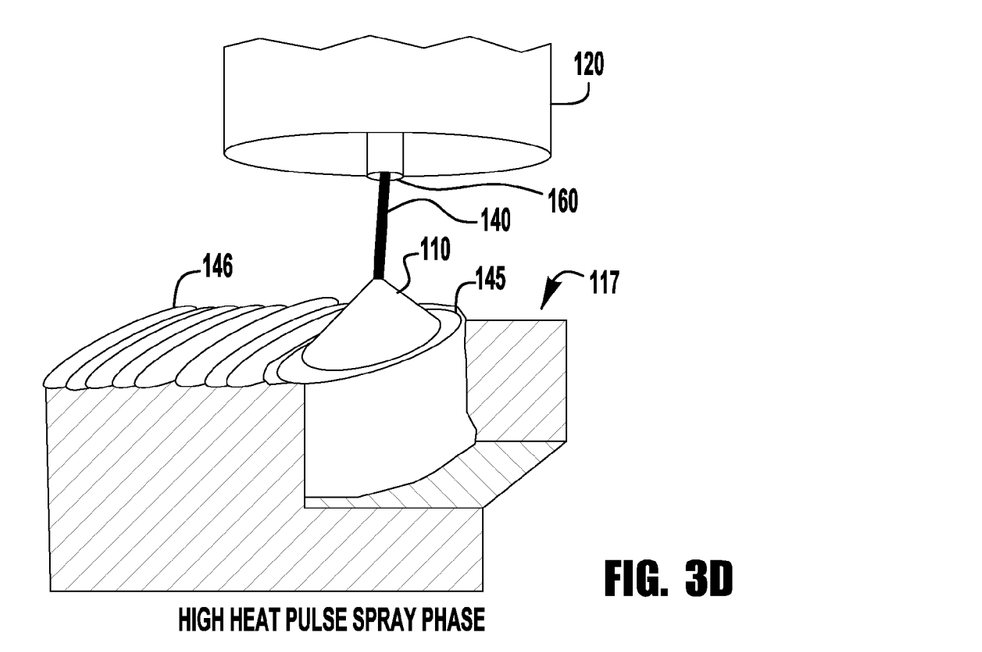

Once the puddle 145 reaches the top of the weld joint 117, the puddle 145 can be expanded over the edges of the weld joint 117 in order to add some reinforcement to the weld (see FIG. 3D). Any excess weld metal can then be machined off at a later time. Like the low heat input duration, the duration of the high heat input process, e.g., the pulse spray transfer phase, can be based on a predetermined period of time or on a predetermined number of cycles, e.g., by counting the peak pulses, associated with the high heat input waveform. For example, the pulse spray transfer duration can be 50 ms to 2 seconds or 5 to 100 pulse cycles. At the end of the predetermined time period or upon reaching the predetermined count, the controller 180 switches from the pulse spray transfer process to the short arc transfer process.

Figure 3E:
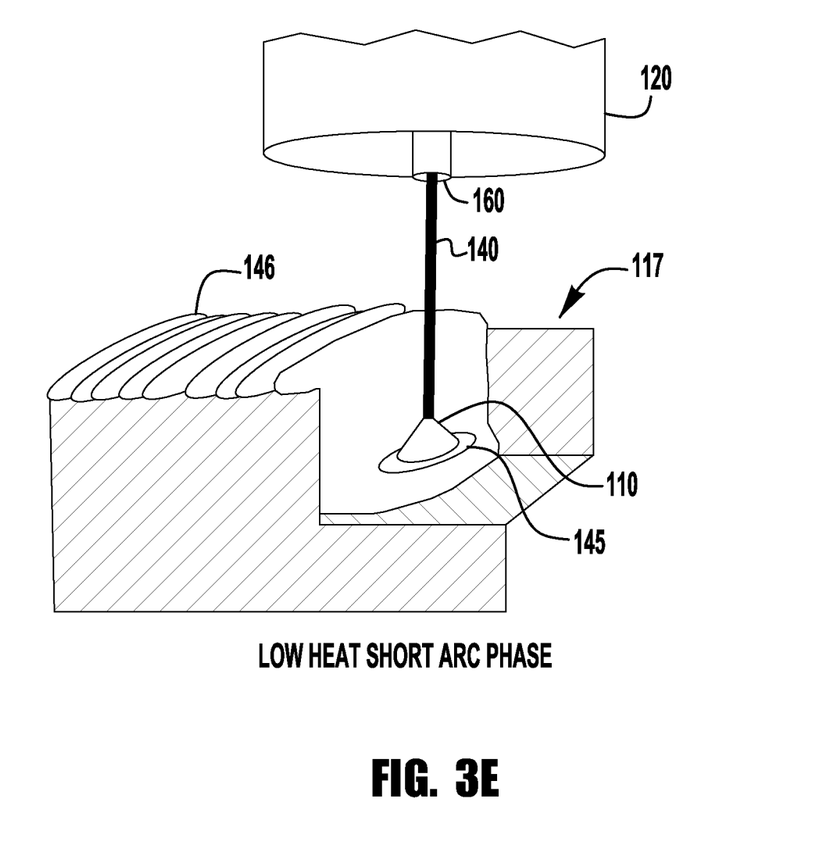

As illustrated in FIG. 3E, once the controller 180 switches to the short arc transfer process, the width of the arc 110 will decrease to its "short arc" size and the arc 110 will no longer want to bridge the gap of the weld joint 117. The arc 110 then slips down the face of the weld bead toward the root of the weld joint 117. As the arc 110 slips down, the "stick out" of wire 140 becomes longer, which increases the resistance of the wire 140. The increased resistance of the wire 140 further decreases the heat input to the workpieces 115A, 115B during this phase.

As described above, exemplary embodiments of the present invention produce a "sewing machine" type action on the arc 110 as the torch 120 travels along the length of the weld joint 117. In some embodiments, the travel speed can be above 15 ipm. In addition, depending on the diameter of the wire, the wire feed speeds can be above 400 ipm (e.g., for a 0.35 diameter wire). In some embodiments, the controller 180 (or some other device) can change the wire feed speed "on the fly" based on welding parameters such as arc voltage, current, etc. The duration of each process, i.e., the high heat input process and the low heat input process, is dependent on numerous parameters such as, e.g., wire feed speed, low heat cycle time, high heat cycle time, short arc length, pulse arc length, etc.

In addition, the composition of the wire may also affect the timing used in the system. For example, wire containing silicon bronze or aluminum bronze provides good characteristics for a process consistent with the present invention. Silicon bronze has a low melting temperature, which minimizes the penetration and admixture. Thus, in applications involving high-carbon steel base material, the weld puddle 145 will not pick up as much carbon and the finished weld will be less susceptible to cracking. In addition, silicon bronze has a relatively big difference between its short arc length and its pulse arc length and thus allows for a relatively wide heat input difference between the low heat process and the high heat process. These factors help the arc 110 to dive to the root of the weld joint 117 and up the sidewalls. Of course, the present invention is not limited to any particular wire composition and wires with other compositions can be used. For example, wire containing aluminum also shows similar behavior.

Figure 4:
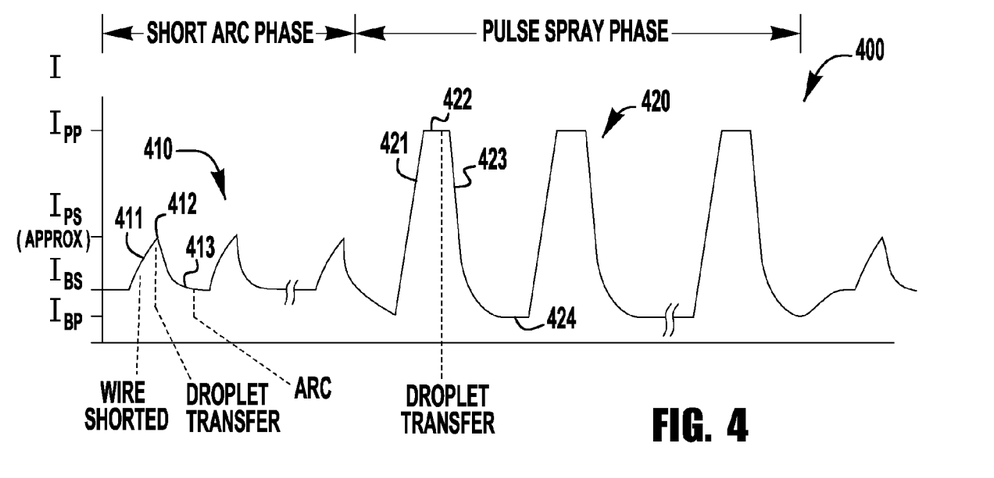
FIG. 4 illustrates an exemplary welding waveform that is consistent with the present invention.

FIG. 4 illustrates an exemplary welding waveform 400 that is output from power supply 170 to the wire 140 via contact tube 160 (see FIG. 2). The welding waveform 400 includes a low heat input period and a high heat input period. Specifically, the low heat input is provided by a short arc current waveform 410 and the high heat input is provided by a pulse spray current waveform 420. The short arc waveform cycles from a background current $I_{BS}$ (413) to a current value $I_{PS}$. During the background current phase 413 the arc 110 is present, but no material from the wire 140 is transferred. When the wire 140 shorts to the weld puddle 145, the current increases in value (see 411) until a droplet from wire 140 is transferred to the weld puddle 145 (see $I_{PS}$). The current value $I_{PS}$ is approximate as the value may vary for each droplet that is transferred. Once the droplet is transferred, the current drops to the background current $I_{BS}$. After the short arc transfer period, the welding current will follow the pulse spray current waveform pattern. As illustrated in FIG. 4, the current will ramp to a peak current value $I_{PP}$ (see 421) and the peak current value $I_{PP}$ will be held at that value for a predetermined time (see 422). The peak current value $I_{PP}$ is set such that a droplet from wire 140 will transfer to the weld puddle 145 during the peak current hold time period. After holding the peak current value $I_{PP}$ for the predetermined time period, the current ramps down to a background current value $I_{BP}$ (see 423). The current is then held at the background current value $I_{BP}$ for a predetermined time period (see 424) before the pulse spray transfer cycle begins again. Although there are many variations in the methods to control the low heat process and the high heat process, the short arc and pulse spray welding waveforms are known to those skilled in the art. Accordingly, they will not be further discussed in detail except as necessary to explain the present invention.

Based on a signal from the controller 180, the power supply 170 (see FIG. 2) outputs the short arc waveform 410 for a predetermined period of time $t_{LH}$, e.g., 50 ms to 1 second. During this time the wire 140 is driven toward the root of the weld joint 117 as discussed above, and droplets from the wire 140 will transfer (see 412) to the weld puddle 145 as the short arc current waveform 410 cycles from the shorting period 411 to the arcing period 413. The predetermined time period $t_{LH}$ can be user settable or automatically determined (with an optional user "fine tune" adjustment) based on factors such weld joint dimensions, type of welding, wire feed speed, low heat cycle time, high heat cycle time, short arc length, pulse arc length, filler wire type, filler wire diameter, shielding gas type and flow rate, etc. Of course, instead of controlling the duration of the low heat input phase based on the predetermined time period $t_{LH}$, the low heat input duration can be based on a predetermined number of short arc transfer cycles (count $c_{LH}$), e.g., by counting the number of shorting events. For example, count $c_{LH}$ can be in a range from 5 to 100 shorting events. Similar to the predetermined time period $t_{LH}$, the predetermined count $c_{LH}$ can be user selectable or automatically determined (with an optional user "fine tune" adjustment) based on the factors discussed above. Of course, along with the predetermined time period $t_{LH}$ and count $c_{LH}$, other parameters of the waveform 410 such as the peak amplitude, peak ramp rate, background amplitude, frequency, etc. can be user adjusted and/or automatically determined based on the above discussed factors.

After the predetermined time period $t_{LH}$ has elapsed (or count $c_{LH}$ has been reached), the waveform 400 starts the pulse spray transfer process 420 for a duration based on a cycle count $c_{HH}$, e.g., by counting the peak pulses. For example, $c_{HH}$ can be in a range from 5 to 100 pulse cycles. Similar to the low heat input parameters, the predetermined high heat input count $c_{HH}$ can be user settable or automatically determined (with an optional user "fine tune" adjustment) based on factors such weld joint dimensions, type of welding, wire feed speed, low heat cycle time, high heat cycle time, short arc length, pulse arc length, filler wire type, filler wire diameter, shielding gas type and flow rate, etc. Of course, instead of controlling the duration of the high heat input phase based on the predetermined count $c_{HH}$, the high heat input duration can be based on a predetermined time period $t_{HH}$, e.g., from 50 ms to 2 seconds. Similar to the predetermined high heat input count $c_{HH}$, the predetermined time period $t_{HH}$ can be user selectable or automatically determined (with an optional user "fine tune" adjustment) based on the factors discussed above. Of course, similar to the low heat input waveform 410, along with the predetermined time period $t_{HH}$ and count $c_{HH}$, other parameters of waveform 420 such as the peak amplitude, peak ramp rate, peak duration, background amplitude, frequency, etc. can be user adjusted and/or automatically determined based on the above described factors. In the embodiment of FIG. 4, the welding waveforms 410 and 420 are DC. However, the present invention is not limited to DC waveforms and one or both of the low heat input process and high heat input process can be AC waveforms or the high heat process can be positive polarity and the low heat process negative polarity.

Figure 5:
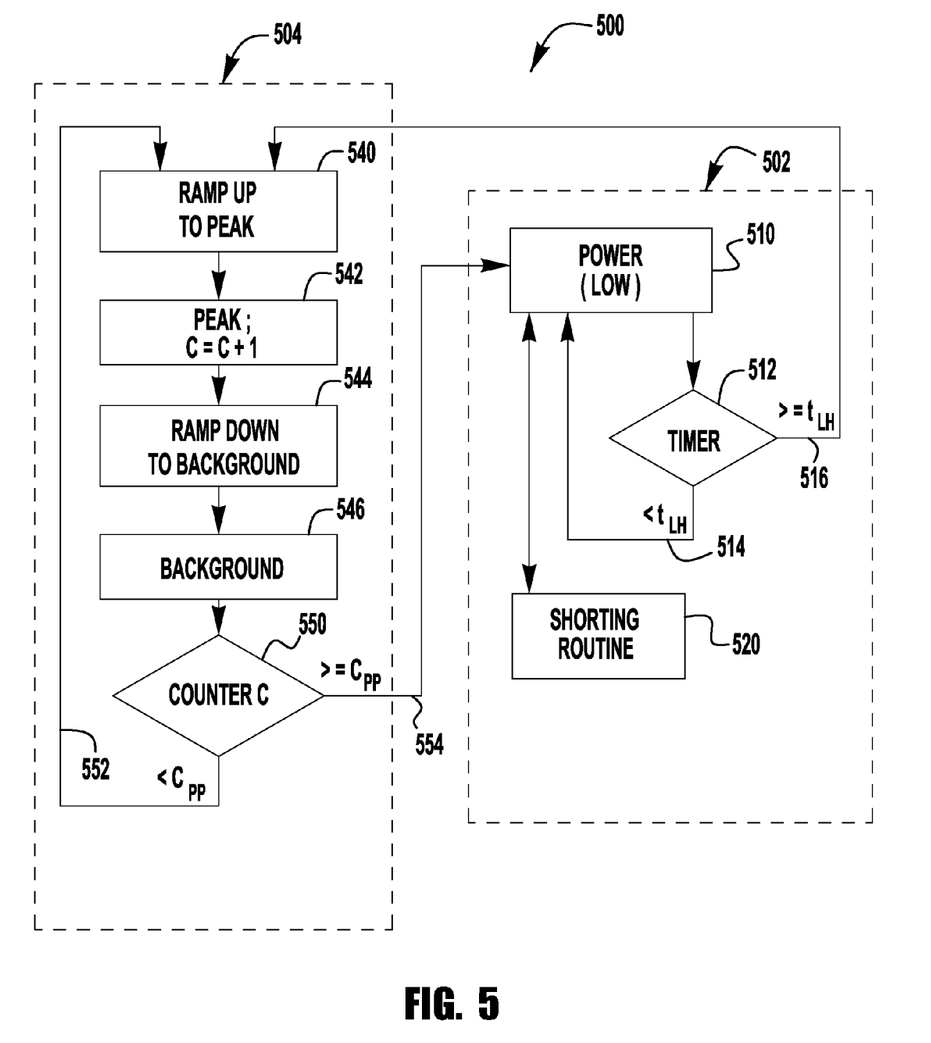
FIG. 5 illustrates a block diagram of a program that can produce the exemplary waveform of FIG. 4.

FIG. 5 illustrates a block diagram of an exemplary control program 500 that can be used in embodiments of the present invention. The control program 500, which can be implemented in controller 180 (or some other device), includes a low heat input program 502 and a high heat input program 504. In exemplary embodiments of the present invention, the low heat input program 502 and the high heat input program 504 correspond to the short arc transfer welding waveform 410 and the pulse spray transfer welding waveform 420, respectively. In step 510, the program starts the short arc transfer phase. Based on, e.g., the arc voltage V (see FIG. 1), the controller 180 determines when the wire 140 has shorted to puddle 145. At this time, the program advances to step 520 where the shorting routine is started. The shorting routine is different based on the type of low heat input process, e.g., short arc, STT, CMT, etc. In our exemplary embodiment, the output current from the power supply 170 is raised during the time the wire 140 is shorted (see FIG. 4 curve 411). Based on the arc voltage V, the controller 180 will determine when the droplet has transferred and the arc 110 has been reestablished. At this time, the program will go to step 510 where the output current from the power supply 170 will drop back to the background level $I_{BS}$ (see FIG. 4 curve 413) and wait for the wire 140 to once again short to the puddle 145. During step 510, the program will also check timer T (step 512) to see if has reached the predetermined time period $t_{LH}$. If the timer T is less than time $t_{LH}$, the program will go back to steps 510 and 520 where the short arc transfer process continues to be performed (step 514). If the timer T (step 512) is greater than or equal to the predetermined time $t_{LH}$, the program will switch to the high heat input program 504 (step 516), which in this exemplary embodiment is a pulse spray transfer process. Of course, instead of timer T, step 512 can include a check of the number of short arc transfer cycles (count $c_{LH}$).

Once the pulse spray transfer process is initiated, the program will go to step 540 where the output current from the power supply 170 is ramped up to a peak current value $I_{PP}$ (see FIG. 4, curve 421). The program will then advance to step 542 where the peak current value $I_{PP}$ is held for a set time period so that a droplet from the wire 140 is transferred (see FIG. 4, curve 422). In step 422, the peak counter C is incremented by one. After the set time period at the peak current $I_{PP}$, the program advances to step 544 where the output current from the power supply 170 is ramped down to a background current $I_{BP}$ (see FIG. 4, curve 423). The program then advances to step 546 where the background current $I_{BP}$ is held for a set time period. After the set time period at the background current $I_{BP}$, the program checks whether the value in counter C is greater than or equal to the predetermined count $c_{HH}$ (step 550). If not, the pulse spray transfer process continues as the program goes back to step 540 (see step 552). If, at step 550, the value in counter C is greater than count $c_{HH}$, the controller 180 will switch back to the low heat input program 502 (step 554) and the short arc transfer process will be performed as described above. The low input/high input processes described above will continue until the welding operation is stopped.

Figure 6:
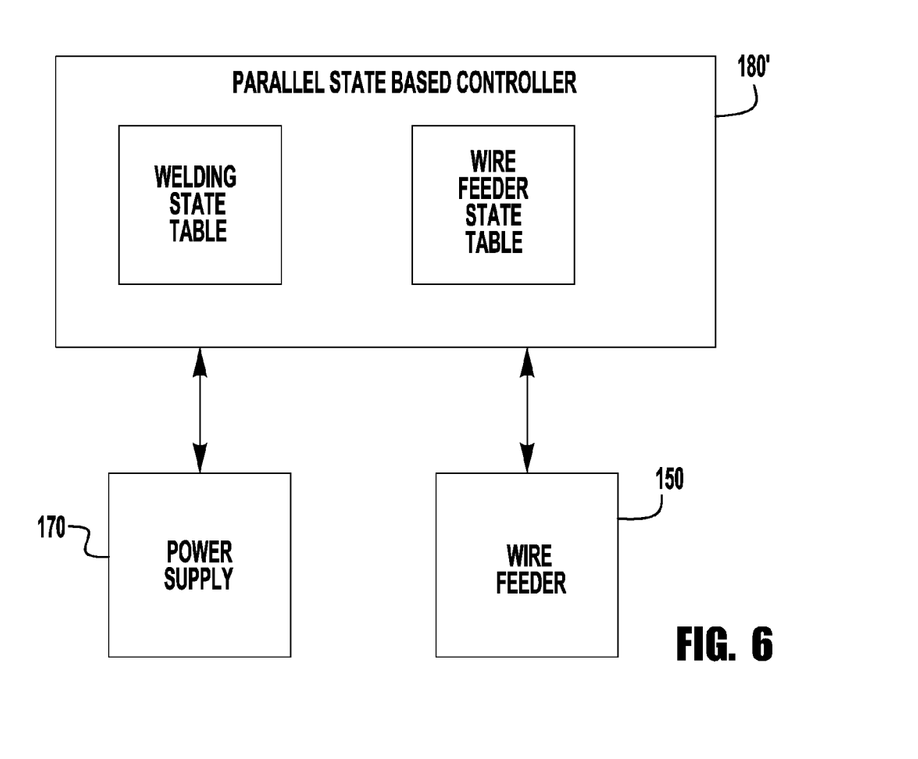
FIG. 6 illustrates an exemplary controller that can be used in the system of FIG. 2.

In some exemplary embodiments, the controller 180 can be a parallel state-based controller with state tables that control various welding equipment, e.g., the power supply 170, the wire feeder 150, etc. For example, as illustrated in FIG. 6, the controller 180' can include a weld state table 182 that is used to control the output of the power supply 170 and wire feeder state table 184 that controls wire feeder 150 to control the wire feed speed of the wire 140. Of course, other state tables to control other equipment can also be included. Parallel state-based controllers are discussed in application Ser. Nos. 13/534,119 and 13/438,703, which are incorporated by reference herein in their entirety. Accordingly, parallel state-based controllers will not be further discussed in detail. In some exemplary embodiments, the weld state table 182 can define one or more welding processes that control the output of the power supply 170. For example, the weld state table 182 can be programmed to perform the steps of the low heat input program 502 and the high heat input program 504 discussed above. Of course, the parallel state-based controller 180' is not limited to the short arc transfer process and other low heat input processes can be programmed into the weld table 182 such as STT, shorted retract welding, etc. Similarly, the controller 180' is not limited to the pulse spray transfer process and other high heat input processes can be used.

The exemplary embodiments discussed above combine a low heat input process with a narrowly focused arc (e.g., the short arc transfer process) with a high heat input process with a wide arc (e.g., the pulse spray transfer process). By combining these two processes, a "sewing machine" type action is created where the arc dives to the bottom of the joint during the low heat input process and then rises to the top of the joint during the high heat input process. The combination of these processes ensures that there is some admixture with the base metal to provide a strong bond but not so much as to weaken the finished weld.

The exemplary embodiments of the welding system, as shown in the Figures, depict the welding power supply, wire feeder system, and controller as separate components. However, this need not be the case as these components can be integrated into a single unit. Furthermore, the control hardware and software (for example a state table) can be found in any one of a welding power supply, system controller and/or a wire feeder. Embodiments of the present invention are not limited in this regard, and can have a modular construction as well, where the components of the system are provided in separate but combinable modules.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims.

What is claimed is:

1. A method of joining of metals, said method comprising: feeding a wire to a weld joint formed by said metals to be joined;
transmitting a welding current waveform through a length of said wire, said welding current waveform comprising a first current waveform for performing a low heat transfer process and a second current waveform sequential to the first current waveform for performing a high heat transfer process;
creating a molten puddle in said weld joint with said welding current waveform;
performing said low heat transfer process on said wire for a predetermined low heat duration to transfer a first portion of said wire to said molten puddle;
performing said high heat transfer process on said wire for a predetermined high heat duration to transfer a second portion of said wire to said molten puddle,
wherein said low heat transfer process creates an arc that forms said molten puddle at a root of said weld joint, and
wherein said high heat transfer process widens a plume of said arc such that said arc climbs sidewalls of said weld joint and said molten puddle follows said arc up said sidewalls to a top of said weld joint.

2. A system for joining of metals, said system comprising:
a wire feeder that feeds a wire to a weld joint formed by said metals to be joined;
a power supply that transmits a welding current waveform through a length of said wire to create a molten puddle in said weld joint, said welding current waveform comprising a first current waveform for performing a low heat transfer process and a second current waveform sequential to the first current waveform for performing a high heat transfer process; and
a controller that performs said low heat transfer process on said wire for a predetermined low heat duration to transfer a first portion of said wire to said molten puddle, and performs said high heat transfer process on said wire for a predetermined high heat duration to transfer a second portion of said wire to said molten puddle,
wherein said low heat transfer process creates an arc that forms said molten puddle at a root of said weld joint, and
wherein said high heat transfer process widens a plume of said arc such that said arc climbs sidewalls of said weld joint and said molten puddle follows said arc up said sidewalls to a top of said weld joint.

3. The method of claim 1, wherein said low heat transfer process is one of short arc welding, surface tension transfer, and shorted retract welding.

4. The method of claim 1, wherein said high heat transfer process is one of pulse spray transfer and wire feed speed modulation.

5. The method of claim 1, wherein at least one of said predetermined low heat duration and said predetermined high heat duration is based on one of a predetermined time period and a predetermined number of cycles of said first current waveform.

6. The method of claim 5, wherein said least one of said predetermined low heat duration and said predetermined high heat duration is based on said predetermined time and said predetermined time is in a range of 50 ms to 1 second.

7. The method of claim 5, wherein said least one of said predetermined low heat duration and said predetermined high heat duration is based on said predetermined number of cycles and said predetermined number of cycles is in a range of 5 to 100 cycles.

8. The method of claim 1, wherein said wire comprises one of silicon bronze and aluminum bronze.

9. The system of claim 2, wherein said low heat transfer process is one of short arc welding, surface tension transfer, and shorted retract welding.

10. The system of claim 2, wherein said high heat transfer process is one of pulse spray transfer and wire feed speed modulation.

11. The system of claim 2, wherein said least one of said predetermined low heat duration and said predetermined high heat duration is based on one of a predetermined time period and a predetermined number of cycles of said first current waveform.

12. The system of claim 11, wherein said least one of said predetermined low heat duration and said predetermined high heat duration is based on said predetermined time and said predetermined time is in a range of 50 ms to 1 second.

13. The system of claim 11, wherein said least one of said predetermined low heat duration and said predetermined high heat duration is based on said predetermined number of cycles and said predetermined number of cycles is in a range of 5 to 100 cycles.

14. The system of claim 2, wherein said wire comprises one of silicon bronze and aluminum bronze.

15. A system for joining of metals, said system comprising:
a wire feeder that feeds a wire to a weld joint formed by said metals to be joined;
a power supply that transmits a welding current waveform through a length of said wire to create a molten puddle in said weld joint, said welding current waveform comprising a first current waveform for performing a low heat transfer process and a second current waveform following the first current waveform for performing a high heat transfer process; and
a controller that performs said low heat transfer process on said wire for a predetermined low heat duration to transfer a first portion of said wire to said molten puddle, and performs said high heat transfer process on said wire for a predetermined high heat duration to transfer a second portion of said wire to said molten puddle,
wherein said low heat transfer process creates an arc that forms said molten puddle at a root of said weld joint, and
wherein said high heat transfer process widens a plume of said arc such that said arc climbs sidewalls of said weld joint and said molten puddle follows said arc up said sidewalls to a top of said weld joint.

16. The system of claim 15, wherein said low heat transfer process is one of short arc welding, surface tension transfer, and shorted retract welding.

17. The system of claim 15, wherein said high heat transfer process is one of pulse spray transfer and wire feed speed modulation.

18. The system of claim 15, wherein said least one of said predetermined low heat duration and said predetermined high heat duration is based on one of a predetermined time period and a predetermined number of cycles of said first current waveform.

19. The system of claim 18, wherein said least one of said predetermined low heat duration and said predetermined high heat duration is based on said predetermined time and said predetermined time is in a range of 50 ms to 1 second.

20. The system of claim 18, wherein said least one of said predetermined low heat duration and said predetermined high heat duration is based on said predetermined number of cycles and said predetermined number of cycles is in a range of 5 to 100 cycles.

21. The system of claim 15, wherein said wire comprises one of silicon bronze and aluminum bronze.

* * * * *